United States Patent
Xu et al.

(10) Patent No.: US 9,001,711 B2
(45) Date of Patent: Apr. 7, 2015

(54) UPLINK FEEDBACK METHOD, SYSTEM AND DEVICE

(75) Inventors: Jing Xu, Beijing (CN); Xueming Pan, Beijing (CN); Zukang Shen, Beijing (CN); Yanan Lin, Beijing (CN); Xuejuan Gao, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 14/238,194

(22) PCT Filed: Aug. 8, 2012

(86) PCT No.: PCT/CN2012/079795
§ 371 (c)(1),
(2), (4) Date: Jun. 17, 2014

(87) PCT Pub. No.: WO2013/020502
PCT Pub. Date: Feb. 14, 2013

(65) Prior Publication Data
US 2014/0293909 A1   Oct. 2, 2014

(30) Foreign Application Priority Data
Aug. 9, 2011   (CN) .......................... 2011 1 0227564

(51) Int. Cl.
*H04B 1/44*   (2006.01)
*H04W 4/00*   (2009.01)
(Continued)

(52) U.S. Cl.
CPC ............ *H04L 5/0055* (2013.01); *H04B 7/2656* (2013.01); *H04L 1/1864* (2013.01); *H04L 1/1861* (2013.01)

(58) Field of Classification Search
USPC .......... 370/255, 278, 280, 282, 294, 314, 321
See application file for complete search history.

(56) References Cited

U.S. PATENT DOCUMENTS

2009/0125363 A1   5/2009   Frederiksen et al.
(Continued)

FOREIGN PATENT DOCUMENTS

CN           101102525 A         1/2008
(Continued)

OTHER PUBLICATIONS

European Patent Office Communication enclosing Extended European Search Report for Counterpart European Patent Application No. 12821904.5, 6 pages, (Jul. 22, 2014).
(Continued)

*Primary Examiner* — Benjamin H Elliott, IV
(74) *Attorney, Agent, or Firm* — Blakely, Sokoloff, Taylor & Zafman LLP

(57) ABSTRACT

There are disclosed a method of and system and apparatus for performing an uplink feedback, applicable to a dynamic sub-frame system, so as to avoid collision of ACK/NACK resources between a non-dynamic system and a dynamic system from occurring. The method includes: determining ACK/NACK resource for carrying ACK/NACK, corresponding to downlink data in a sub-frame n according to a set of sub-frames including a sub-frame in which the downlink data is received; and transmitting ACK/NACK information corresponding to the downlink data over the ACK/NACK resource in the sub-frame n, wherein the set of sub-frames includes a first set of sub-frames and/or a second set of sub-frames; the set of sub-frames is determined by obtained uplink/downlink sub-frame configuration information and flexible sub-frame information; the uplink/downlink sub-frame configuration information indicates the type of each sub-frame in a radio frame as an uplink sub-frame, a downlink sub-frame and a special sub-frame; and the flexible sub-frame information indicates the type of each sub-frame in a radio frame as an uplink sub-frame, a downlink sub-frame, a special sub-frame and a flexible sub-frame, wherein the flexible sub-frame can be used for transmission of uplink or downlink data.

20 Claims, 5 Drawing Sheets

(51) Int. Cl.
*H04L 5/00* (2006.01)
*H04B 7/26* (2006.01)
*H04L 1/18* (2006.01)

(56) References Cited

U.S. PATENT DOCUMENTS

| | | | | |
|---|---|---|---|---|
| 2009/0303956 | A1* | 12/2009 | Chen et al. | 370/329 |
| 2011/0176461 | A1* | 7/2011 | Astely et al. | 370/280 |
| 2012/0263057 | A1* | 10/2012 | Choi et al. | 370/252 |
| 2013/0188516 | A1* | 7/2013 | He et al. | 370/254 |
| 2013/0301490 | A1* | 11/2013 | He et al. | 370/280 |
| 2013/0336300 | A1* | 12/2013 | Choi et al. | 370/336 |
| 2014/0105077 | A1* | 4/2014 | Chen | 370/280 |
| 2014/0204961 | A1* | 7/2014 | Hooli et al. | 370/476 |
| 2014/0293909 | A1* | 10/2014 | Xu et al. | 370/329 |

FOREIGN PATENT DOCUMENTS

| | | |
|---|---|---|
| CN | 102088341 A | 6/2011 |
| CN | 102111252 A | 6/2011 |
| CN | 102271032 A | 12/2011 |
| EP | 2 736 293 A1 | 5/2014 |

OTHER PUBLICATIONS

3GPP, "LTE; Evolved Universal Terrestrial Radio Access (E-UTRA); Physical Layer Procedures (3GPP TS 36.213 Version 10.2.0 Release 10)", ETSI TS 136 213 V10.2.0, 122 pages, (Jun. 2011).

Written Opinion of the International Search Authority for PCT/CN2012/079795 with full English translation, 11 pgs. (Nov. 15, 2012).

PCT International Search Report for PCT Counterpart Application No. PCT/CN2012/079795 with full English translation, 5 pgs. (Nov. 15, 2012).

\* cited by examiner

UPLINK FEEDBACK METHOD, SYSTEM AND DEVICE

CROSS-REFERENCE TO RELATED APPLICATIONS

This present application is a U.S. National Stage under 35 U.S.C. 371 of International Application No. PCT/CN2012/079795, filed on Aug. 8, 2012, entitled UPLINK FEEDBACK METHOD, SYSTEM AND DEVICE, designating the United States and claiming the benefit of Chinese Patent Application No. 201110227564.5, filed with the Chinese Patent Office on Aug. 9, 2011 and entitled "Method of and system and apparatus for performing uplink feedback", which was incorporated by reference in its entirety.

FIELD OF THE INVENTION

The present invention relates to the field of communications and particularly to a method of and system and apparatus for performing an uplink feedback.

BACKGROUND OF THE INVENTION

A Time Division Duplex (TDD) mode which is one of two major fundamental duplex systems has gained increasing attention along with a constantly increasing bandwidth demand of broadband mobile communications. In the TDD system, the same frequency resource is used for both uplink-downlink transmission, and uplink-downlink signals are transmitted in different timeslots. In common TDD systems including a Time Division Synchronized Code Division Multiple Access (TD-SCDMA) which is a third generation (3G) mobile system, and a TD-SCDMA Long Term Evolution (TD-LTE) system which is a four generation (4G) mobile communication system, uplink-downlink timeslots are allocated statically or semi-statically, and a common practice is to determine and keep an allocation proportion of uplink-downlink timeslots unchanged according to a type of cell and a general service proportion in the course of network planning. This is a relatively simple practice and also effective in the context of a macro cell with large coverage. Along with the development of technologies, more and more low power base stations including a pico cell, a Home NodeB, etc., have been deployed to provide small local coverage, and in such cells, there are a lower number of users and significantly changing service demands of the users, so a proportion demand of uplink-downlink services of the cells are changing dynamically. Although an online change to a proportion of uplink-downlink timeslots of a cell is also supported, for example, in the TD-LTE standard, a complicated signaling flow and a configuration period of time are necessitated thus lowering the performance of the system while failing to trace a real-time service change condition.

Some more dynamic TDD uplink-downlink configuration solutions have gained attention.

In a specific temporal cycle, there are four types of sub-frames, particularly sub-frames fixedly used for downlink transmission, sub-frame fixedly used for uplink transmission, and sub-frame flexibly allocated for uplink or downlink transmission. Referring to FIG. 1, the temporal cycle is a radio frame (which is illustrated only as an example, but another temporal cycle is also possible), where sub-frames #0 and #5 are fixed downlink sub-frame, sub-frames #2 and #7 are fixed uplink sub-frame, sub-frames #1 and #6 are special sub-frame (which can also be allocated as fixed sub-frames), and other sub-frames (#3, #4, #8 and #9) are sub-frame flexibly allocated for uplink or downlink transmission. For the last type of sub-frames, a base station can dynamically configure them dependent upon a real-time service demand and channel condition to accommodate a dynamic change in service demand.

For the TDD system, bundling and multiplexing technologies are used for a Hybrid Automatic Repeat request (HARQ), that is, ACK/NACK of multiple downlink sub-frames is fed back over a Physical Uplink Control Channel (PUCCH). For the multiplexing technology, the ACK/NACK status is related to both information bit to be fed back over the PUCCH and a PUCCH resource index. For the bundling technology, although the ACK/NACK status is related to only the information bit to be fed back over the PUCCH, the PUCCH resource index is mapped in the same manner as in the multiplexing technology in order to avoid PUCCH resource confliction between users. Typically there is no confliction occurring with PUCCH resource mapping if a uniquely corresponding HARQ timing scheme is used for an uplink-downlink configuration scheme.

In a dynamic system, the use of a new HARQ scheme (also including the reuse of an HARQ scheme corresponding to a specific configuration of a non-dynamic system) is required in order to accommodate a flexible change in uplink-downlink sub-frame configuration. Also in order to ensure backward compatibility, it is necessary to semi-statically configure an existing uplink-downlink configuration and to use an HARQ scheme corresponding thereto for user equipments of lower releases. Thus different HARQ schemes may be used for users of R11 and later releases from users of lower releases. There may be PUCCH resource confliction for these two types of users if the existing PUCCH format 1/1a/1b resource index $n_{PUCCH}^{(1)}$ mapping method is used.

The principle of $n_{PUCCH}^{(1)}$ mapping will be introduced below.

$n_{PUCCH}^{(1)}$ can be configured by a higher layer for use in an Uplink Scheduling Request (SR), Semi-Persistent Scheduling (SPS) and other situations without Physical Downlink Control Channel (PDCCH) scheduling; and also can be bound with $n_{CCE}$ (an index of the first CCE, in a corresponding downlink sub-frame, used for a PDCCH) for use in situations with PDCCH scheduling.

Typically in order to avoid confliction of higher layer configured $n_{PUCCH}^{(1)}$ with calculated $n_{PUCCH}^{(1)}$, ACK/NACK/SR resources are divided by the parameter $N_{PUCCH}^{(1)}$ into two sections. The higher layer configured $n_{PUCCH}^{(1)}$ satisfies $n_{PUCCH}^{(1)} < N_{PUCCH}^{(1)}$, and the calculated $n_{PUCCH}^{(1)}$ satisfies $n_{PUCCH}^{(1)} \geq N_{PUCCH}^{(1)}$.

Noted the higher layer configured $n_{PUCCH}^{(1)}$ is configured by the base station itself, so $n_{PUCCH}^{(1)} \geq N_{PUCCH}^{(1)}$ will not be precluded.

For the sake of a concise description, a set of ACK/NACK/SR resources indicated by higher layer signaling is simply referred to as a higher layer configured section; and a set of ACK/NACK resources bound with $n_{CCE}$ is simply referred to as a predefined section or a calculation section. No boundary between the two sections is defined in the standard, but typically the higher layer section precedes the calculation section with $n_{PUCCH}^{(1)}$ being a boundary between them, and for the sake of a simplified subsequent description, this typical scenario will be applicable throughout as an example. However in fact, respective solutions will not be limited to the typical scenario.

In order to lower the number of resource fragments, $n_{PUCCH}^{(1)}$ is calculated for firstly a sub-frame and then a section (the section actually refers to a range of values of $n_{CCE}$, and sections are typically allocated dependent upon the number of PDCCH symbols, that is, the number of sections is equal to the number of PDCCH symbols). As illustrated in FIG. 2, there is a $n_{PUCCH}^{(1)}$ mapping method (the uplink-downlink configuration 1).

As specified by the protocol:

For the non-dynamic TDD system, with ACK/NACK bundling or ACK/NACK multiplexing, with M=1, the UE transmits HARQ-ACK using the PUCCH resource number $n_{PUCCH}^{(1)}$ in the sub-frame n, where:

In the sub-frame n−k, if there is either a PDSCH indicated by a PDCCH(s) or a PDCCH indicating uplink Semi-Persistent Scheduling (SPS) resource releasing, where k∈K with K being a set $\{k_0, k_1, \ldots k_{M-1}\}$ including M elements and the value of M being related to an uplink-downlink configuration (as depicted in Table 1), then the UE firstly selects a value of p from the set $\{0,1,2,3\}$ to satisfy $N_p \leq n_{CCE} < N_{p+1}$, where $n_{CCE}$ is the index of a first Control Channel Element (CCE), in the sub-frame n−$k_m$, used for a PDCCH, where $k_m$ is the lowest value in the set K and satisfies such a condition that the UE detects the PDCCH in the sub-frame n−$k_m$. $N_p$=max$\{0, \lfloor [N_{RB}^{DL} \times (N_{sc}^{RB} \times p-4)]/36 \rfloor \}$ is defined, and then ACK/NACK resource index used for an ACK/NACK feedback is $n_{PUCCH}^{(1)}$=(M−m−1)×$N_p$+m×$N_{p+1}$+$n_{CCE}$+$N_{PUCCH}^{(1)}$, where $N_{PUCCH}^{(1)}$ is a higher layer configured parameter, and $N_{PUCCH}^{(1)}$ is an ACK/NACK/SR resource index, M is the number of downlink sub-frames corresponding to the same uplink feedback sub-frame, m is the index of a downlink sub-frame, $n_{CCE}$ is the index of a first CCE, in the sub-frame n−$k_m$, used for a PDCCH, and $N_p$=max$\{0, \lfloor [N_{RB}^{DL} \times (N_{sc}^{RB} \times p-4)]/36 \rfloor \}$ with $N_{RB}^{DL}$ being the number of downlink PRBs and $N_{sc}^{RB}$ being the number of sub-carriers in a PRB, that is 12, and p being a value in $\{0,1,2,3\}$.

For a PUCCH in a multi-port transmission mode, a PUCCH resource of the second antenna port is indexed by incrementing a PUCCH resource of the first antenna port by 1, that is, $n_{PUCCH}^{(1)}$=(M−m−1)×$N_p$+m×$N_{p+1}$+$n_{CCE}$+$N_{PUCCH}^{(1)}$+1; and Moreover for two aggregated carriers and the current sub-frame for an ACK/NACK feedback corresponding to only one downlink sub-frame, for the carrier in a multi-codeword transmission mode, a PUCCH resource corresponding to the second codeword is indexed by incrementing a PUCCH resource corresponding to the first codeword by 1, that is, $n_{PUCCH}^{(1)}$=(M−m−1)×$N_p$+m×$N_{p+1}$+$n_{CCE}$+$N_{PUCCH}^{(1)}$.

In the sub-frame n−k (k∈K), if there is only a PDSCH transmitted without being indicated by a PDCCH, then $n_{PUCCH}^{(1)}$ is configured jointly by a higher layer and Table 2.

TABLE 2

PUCCH Resource Index for Downlink Semi-Persistent Scheduling

| Value of 'TPC command for PUCCH' | $n_{PUCCH}^{(1,p)}$ |
|---|---|
| '00' | The first PUCCH resource index configured by the higher layers |
| '01' | The second PUCCH resource index configured by the higher layers |
| '10' | The third PUCCH resource index configured by the higher layers |
| '11' | The fourth PUCCH resource index configured by the higher layers |

For TDD ACK/NACK multiplexing, with M>1, in the sub-frame n, $n_{PUCCH,i}^{(1)}$ is defined as an ACK/NACK feedback resource index derived from the sub-frame n−$k_i$, and HARQ-ACK(i) is defined as particular information fed back by ACK/NACK/DTX corresponding to the sub-frame n−$k_i$, where $k_i \in K$ (as depicted in Table 1) and 0≤i≤M−1:

For a PDSCH in the sub-frame n−$k_i$ or a PDCCH indicating SPS resource releasing, where $k_i \in K$, the ACK/NACK feedback resource index is $n_{PUCCH,i}^{(1)}$=(M−i−1)×$N_p$+i×$N_{p+1}$+$n_{CCE,i}$+$N_{PUCCH}^{(1)}$, where p∈$\{0,1,2,3\}$, $N_p \leq n_{CCE} < N_{p+1}$ is satisfied, $N_p$=max$\{0, \lfloor [N_{RB}^{DL} \times (N_{sc}^{RB} \times p-4)]/36 \rfloor \}$, $n_{CCE,i}$ is the index of a first CCE, in the sub-frame n−$k_i$, used for a PDCCH, and $N_{PUCCH}^{(1)}$ is a higher layer configured parameter.

For a PDSCH without being indicated by a PDCCH in the sub-frame n−$k_i$, $n_{PUCCH}^{(1)}$ is configured jointly by a higher layer and Table 2.

Comparing the ACK/NACK bundling and ACK/NACK multiplexing solutions, both of their fundamental principles are the same, that is, the relationship between $n_{PUCCH}^{(1)}$ and $n_{CCE,i}$ is created based upon $n_{PUCCH,i}^{(1)}$=(M−i−1)×$N_p$+i×$N_{p+1}$+$n_{CCE,i}$+$N_{PUCCH}^{(1)}$. Their difference lies in that in ACK/NACK bundling, i is a determined value which is i=m, and $k_m$ is the lowest value in the set K and satisfies such a condition that the UE detects the PDCCH in the sub-frame n−$k_m$; and in ACK/NACK multiplexing, i corresponds in one-to-one to a downlink sub-frame, that is, each downlink sub-frame corresponds to $n_{PUCCH,i}^{(1)}$.

This application is primarily focused upon how to configure $n_{PUCCH,i}^{(1)}$, and particularly how to use $n_{PUCCH,i}^{(1)}$ in ACK/NACK bundling and ACK/NACK multiplexing is not a focus of this application, and the use of the existing system solution is recommended, so ACK/NACK bundling will not be further distinguished from ACK/NACK multiplexing in the following description.

TABLE 1

Downlink association set index K: $\{k_0, k_1, \ldots k_{M-1}\}$ for TDD

| UL-DL Configuration | Sub-frame n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

For an SR and the situation of SPS without being PDCCH scheduling, a PUCCH format 1/1a/1b resource is configured by the base station itself, and confliction between users of different releases can be avoided by the base station from occurring; and For the situation of a PDSCH with PDCCH scheduling or a PDCCH indicating SPS resource releasing, a PUCCH format 1/1a/1b resource is determined in a predefined scheme, that is, the relationship between $n_{PUCCH,i}^{(1)}$ and $n_{CCE,i}$ of the PUCCH format 1/1a/1b resource is specified in the protocol and both the base station and the user equipment obtain $n_{PUCCH,i}^{(1)}$ by referring to this relationship. In the dynamic system, there are uses of different releases. When there are different HARQ schemes of the different releases, mapping of an ACK/NACK resource as in the prior art may result in ACK/NACK resource confliction between the users.

SUMMARY OF THE INVENTION

The invention provides a method of and system and apparatus for performing an uplink feedback so as to avoid the problem of possible ACK/NACK resource confliction between users in the situation of a PDSCH with PDCCH scheduling or a PDCCH indicating SPS resource releasing.

An embodiment of the invention provides an uplink feedback method, applicable to a dynamic sub-frame system, the method including:

determining ACK/NACK resource, for carrying ACK/NACK corresponding to downlink data, in a sub-frame n according to a set of sub-frames including a sub-frame in which the downlink data is received; and transmitting ACK/NACK information corresponding to the downlink data over the ACK/NACK resource in the sub-frame n, wherein the set of sub-frames includes a first set of sub-frames and/or a second set of sub-frames; the first set of sub-frames and/or the second set of sub-frames are/is determined by obtained uplink/downlink sub-frame configuration information and flexible sub-frame information; the uplink/downlink sub-frame configuration information indicates the type of each sub-frame in a radio frame, and corresponding types of sub-frames include uplink sub-frames, downlink sub-frames and special sub-frames; and the flexible sub-frame information indicates the type of each sub-frame in a radio frame, and corresponding types of sub-frames include uplink sub-frames, downlink sub-frames, special sub-frames and flexible sub-frames, wherein the flexible sub-frames can be used for transmission of uplink or downlink data, and n is a sub-frame number.

An embodiment of the invention provides a method of scheduling an uplink feedback of a user equipment, the method including determining ACK/NACK resource, for carrying ACK/NACK corresponding to downlink data, in a sub-frame n according to a set of sub-frames including a sub-frame in which the downlink data is transmitted; and receiving ACK/NACK information corresponding to the downlink data over the ACK/NACK resource in the sub-frame n, wherein the set of sub-frames includes a first set of sub-frames and/or a second set of sub-frames; the first set of sub-frames and/or the second set of sub-frames are/is determined by obtained uplink/downlink sub-frame configuration information and flexible sub-frame information; the uplink/downlink sub-frame configuration information indicates the type of each sub-frame in a radio frame, and corresponding types of sub-frames include uplink sub-frames, downlink sub-frames and special sub-frames; and the flexible sub-frame information indicates the type of each sub-frame in a radio frame, and corresponding types of sub-frames include uplink sub-frames, downlink sub-frames, special sub-frames and flexible sub-frames, wherein the flexible sub-frames can be used for transmission of uplink or downlink data, and n is a sub-frame number.

An embodiment of the invention provides an uplink feedback apparatus, the apparatus including:

an obtaining unit configured to determine ACK/NACK resource, for carrying ACK/NACK corresponding to downlink data, in a sub-frame n according to a set of sub-frames including a sub-frame in which the downlink data is received; and a transmitting unit configured to transmit ACK/NACK information corresponding to the downlink data over the ACK/NACK resource in the sub-frame n.

wherein the set of sub-frames includes a first set of sub-frames and/or a second set of sub-frames; the first set of sub-frames and/or the second set of sub-frames are/is determined by obtained uplink/downlink sub-frame configuration information and flexible sub-frame information; the uplink/downlink sub-frame configuration information indicates the type of each sub-frame in a radio frame, and corresponding types of sub-frames include uplink sub-frames, downlink sub-frames and special sub-frames; and the flexible sub-frame information indicates the type of each sub-frame in a radio frame, and corresponding types of sub-frames include uplink sub-frames, downlink sub-frames, special sub-frames and flexible sub-frames, wherein the flexible sub-frames can be used for transmission of uplink or downlink data, and n is a sub-frame number.

An embodiment of the invention provides an apparatus for scheduling an uplink feedback of a user equipment, the apparatus including:

an obtaining unit configured to determine ACK/NACK resource, for carrying ACK/NACK corresponding to downlink data, in a sub-frame n according to a set of sub-frames including a sub-frame in which the downlink data is transmitted; and a receiving unit configured to receive ACK/NACK information corresponding to the downlink data over the ACK/NACK resource in the sub-frame n, wherein the set of sub-frames includes a first set of sub-frames and/or a second set of sub-frames; the first set of sub-frames and/or the second set of sub-frames are/is determined by obtained uplink/downlink sub-frame configuration information and flexible sub-frame information; the uplink/downlink sub-frame configuration information indicates the type of each sub-frame in a radio frame, and corresponding types of sub-frames include uplink sub-frames, downlink sub-frames and special sub-frames; and the flexible sub-frame information indicates the type of each sub-frame in a radio frame, and corresponding types of sub-frames include uplink sub-frames, downlink sub-frames, special sub-frames and flexible sub-frames, wherein the flexible sub-frames can be used for transmission of uplink or downlink data, and n is a sub-frame number.

An embodiment of the invention provides a communication system including:

a user equipment configured to determine ACK/NACK resource, for carrying ACK/NACK corresponding to downlink data, in a sub-frame n according to a set of sub-frames including a sub-frame in which the downlink data is received; and to transmit ACK/NACK information corresponding to the downlink data over the ACK/NACK resource in the sub-frame n; and a base station configured to determine the ACK/NACK resource, for carrying the ACK/NACK corresponding to the downlink data, in the sub-frame n according to the set of sub-frames including the sub-frame in which the downlink data is transmitted; and to receive the ACK/NACK information corresponding to the downlink data over the ACK/NACK resource in the sub-frame n, wherein the set of sub-frames includes a first set of sub-frames and/or a second set of sub-frames; the first set of sub-frames and/or the second set of sub-frames are/is determined by obtained uplink/downlink sub-frame configuration information and flexible sub-frame information; the uplink/downlink sub-frame configuration information indicates the type of each sub-frame in a radio frame, and corresponding types of sub-frames include uplink sub-frames, downlink sub-frames and special sub-frames; and the flexible sub-frame information indicates the type of each sub-frame in a radio frame, and corresponding types of sub-frames include uplink sub-frames, downlink sub-frames, special sub-frames and flexible sub-frames, wherein the flexible sub-frames can be used for transmission of uplink or downlink data, and n is a sub-frame number.

In the embodiments of the invention, at the user equipment side, ACK/NACK resource, for carrying ACK/NACK corresponding to downlink data, in a sub-frame n is determined according to a set of sub-frames including a sub-frame in which the downlink data is received; and ACK/NACK information corresponding to the downlink data is transmitted over the ACK/NACK resource in the sub-frame n, where the set of sub-frames includes a first set of sub-frames and/or a second set of sub-frames; and the first set of sub-frames and/or the second set of sub-frames are/is determined by obtained uplink/downlink sub-frame configuration information and flexible sub-frame information.

The uplink/downlink sub-frame configuration information indicates the type of each sub-frame in a radio frame, and corresponding types of sub-frames include uplink sub-frames, downlink sub-frames and special sub-frames; and the flexible sub-frame information indicates the type of each sub-frame in a radio frame, and corresponding types of sub-frames include uplink sub-frames, downlink sub-frames, special sub-frames and flexible sub-frames, where the flexible sub-frames can be used for transmission of uplink or downlink data. The uplink/downlink sub-frame configuration information configures the information about the ACK/NACK resource for carrying the ACK/NACK corresponding to the downlink data in the first set of sub-frames, that is, a downlink sub-frame included in both a non-dynamic system feedback scheme and a dynamic system feedback scheme; and the flexible sub-frame information configures the information about the ACK/NACK resource for carrying the ACK/NACK corresponding to the downlink data in the second set of sub-frames, so confliction of PUCCH resources between the non-dynamic system and the dynamic system can be avoided.

DETAILED DESCRIPTION OF THE EMBODIMENTS

In order to avoid collision between PUCCH resources for carrying ACK/NACK in a dynamic system and a non-dynamic system, at the user equipment side, ACK/NACK resource, for carrying ACK/NACK corresponding downlink data, in a sub-frame n is determined according to a set of sub-frames including a sub-frame in which the downlink data is received; and ACK/NACK information corresponding to the downlink data is transmitted over the ACK/NACK resource in the sub-frame n. At the base station side, ACK/NACK resource, for carrying ACK/NACK corresponding to downlink data, in a sub-frame n is determined according to a set of sub-frames including a sub-frame in which the downlink data is transmitted; and ACK/NACK information corresponding to the downlink data is received over the ACK/NACK resource in the sub-frame n; and Where the set of sub-frames includes a first set of sub-frames and/or a second set of sub-frames; the first set of sub-frames and/or the second set of sub-frames are/is determined by obtained uplink/downlink sub-frame configuration information and flexible sub-frame information; the uplink/downlink sub-frame configuration information indicates the type of each sub-frame in a radio frame, and corresponding types of sub-frames include uplink sub-frames, downlink sub-frames and special sub-frames; and the flexible sub-frame information indicates the type of each sub-frame in a radio frame, and corresponding types of sub-frames include uplink sub-frames, downlink sub-frames, special sub-frames and flexible sub-frames, where the flexible sub-frames can be used for transmission of uplink or downlink data, and n is a sub-frame number.

For example, the first set of sub-frames includes at least all the sub-frames belonging to both a set P (a first subset) and a set Q (a second subset); and the second set of sub-frames includes all the sub-frames belonging to the set Q but not the set P, where:

The set P is determined according to the uplink/downlink sub-frame configuration information, and the set P includes the downlink sub-frames and/or the special sub-frames indicated by the uplink/downlink sub-frame configuration information; and The set Q is determined according to the flexible sub-frame information, and the set Q includes any one or more of the downlink sub-frames, the special sub-frames and the flexible sub-frames indicated by the flexible sub-frame information.

Here the ACK/NACK resource can also be referred to as a PUCCH resource for carrying ACK/NACK.

Figure 1:
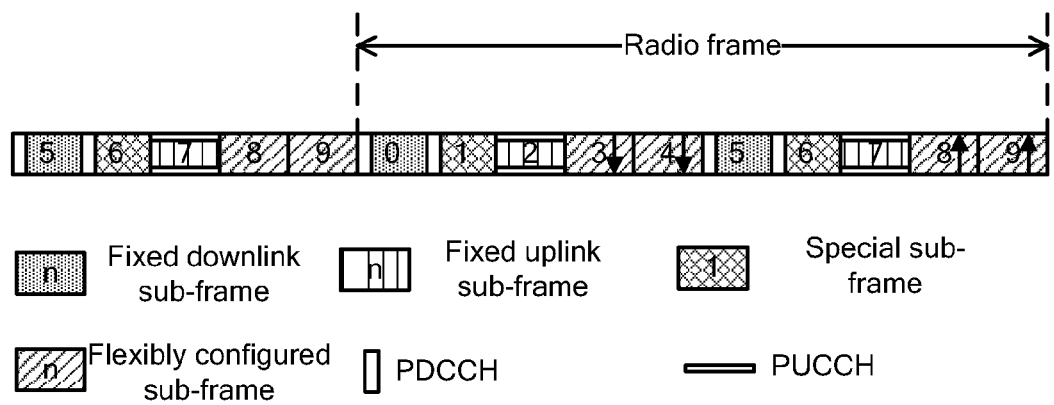
FIG. 1 is a dynamic uplink/downlink sub-frame allocation scheme in the prior art.
Figure 2:
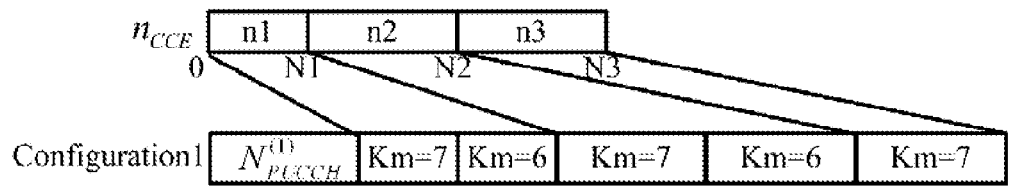
FIG. 2 is the $n_{PUCCH}^{(1)}$ mapping method in the prior art.
Figure 3:
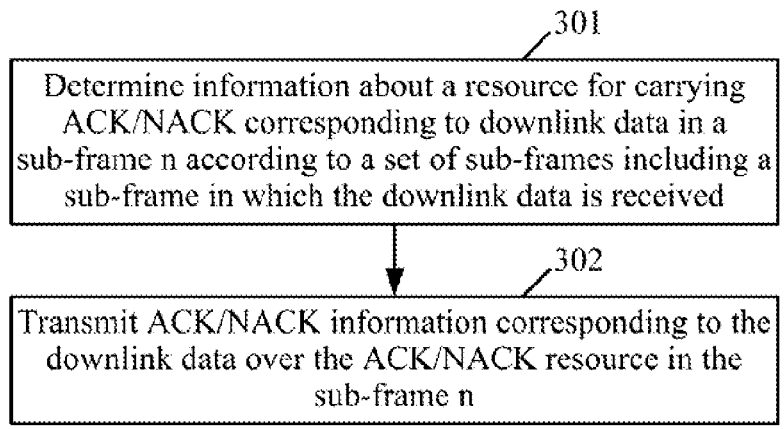
FIG. 3 is a schematic flow diagram of an uplink feedback method in an embodiment of the invention.

Referring to FIG. 3, there is a method of performing an uplink feedback at the user equipment side according to an embodiment of the invention, applicable to a dynamic sub-frame system which is a system including a Physical Downlink Shared Channel (PDSCH) with Physical Downlink Control Channel (PDCCH) scheduling or a PDCCH indicating uplink Semi-Persistent Scheduling (SPS) resource releasing, the method particularly including the following steps:

Step 301: ACK/NACK resource, for carrying ACK/NACK corresponding to downlink data, in a sub-frame n is determined according to a set of sub-frames including a sub-frame in which the downlink data is received.

(1) If the sub-frame in which the downlink data is received belongs to a first set of sub-frames, then the ACK/NACK resource for carrying the ACK/NACK corresponding to the downlink data in the sub-frame n is determined according to a scheme and parameters corresponding to the first set of sub-frames; and (2) if the sub-frame in which the downlink data is received belongs to a second set of sub-frames, then the ACK/NACK resource for carrying the ACK/NACK corresponding to the downlink data in the sub-frame n is determined according to a scheme and parameters corresponding to the second set of sub-frames.

In the case of (1), if the sub-frame in which the downlink data is received belongs to the first set of sub-frames, then the information about the ACK/NACK resource for carrying the ACK/NACK corresponding to the downlink data in the sub-frame n for the first set of sub-frames can be obtained using a PUCCH resource obtaining scheme and relevant parameters predefined for a non-dynamic system.

In the case (2), if the sub-frame in which the downlink data is received belongs to the second set of sub-frames, then the information about the ACK/NACK resource for carrying the ACK/NACK corresponding to the downlink data in the sub-frame n for the second set of sub-frames can be obtained by receiving higher layer signaling transmitted from a base station.

For example, the higher layer signaling includes information about ACK/NACK resource, for carrying ACK/NACK in the corresponding sub-frame n, configured by the base station for a first sub-frame in the second set of sub-frames, and then information about ACK/NACK resource, for carrying ACK/NACK, in the sub-frame n corresponding to a subsequent sub-frame in the second set of sub-frames is obtained according to the ACK/NACK resource, in the sub-frame n, configured for the first sub-frame and a preset offset by which the sub-frames are spaced.

For example, the higher signaling includes information about ACK/NACK resource, for carrying ACK/NACK in the corresponding sub-frame n, configured by the base station for a part or all of the sub-frames in the second set of sub-frames.

In another embodiment, if the sub-frame in which the downlink data is received belongs to the second set of sub-frames, then information about ACK/NACK resource, for carrying ACK/NACK, in the sub-frame n corresponding to each sub-frame in the second set of sub-frames can be obtained in a predefined configuration scheme.

An ACK/NACK resource is calculated in the predefined configuration scheme according to the index of a first Control Channel Element (CCE) used for a Physical Downlink Control Channel (PDCCH), and the predefined configuration scheme includes:

$$n_{PUCCH,i}^{(1)} = F + (M_{dyn} - i - 1)N_p + iN_{p+1} + n_{CCE};$$

Where F is a predefined resource starting point of ACK/NACK corresponding to the second set of sub-frames, $M_{dyn}$ is the number of sub-frames in the second set of sub-frame, $n_{CCE}$ is the index of a first CCE, in a sub-frame n-$k_m$, used for a PDCCH, $N_p = \max\{0, \lfloor [N_{RB}^{DL} \times (N_{sc}^{RB} \times p - 4)]/36 \rfloor\}$ with $N_{RB}^{DL}$ being the number of downlink Physical Resource Blocks (PRBs), $N_{sc}^{RB}$ being the number of sub-carriers in a PRB, that is, 12, and p being a value in $\{0,1,2,3\}$, and $n_{PUCCH,i}^{(1)}$ is an ACK/NACK/uplink Scheduling Request (SR) resource index corresponding to the i-th sub-frame in the second set of sub-frames.

When the index of a CCE corresponds to multiple ACK/NACK resources, after an ACK/NACK resource is obtained in the formula of $n_{PUCCH,i}^{(1)} = F + (M_{dyn} - i - 1)N_p + iN_{p+1} + n_{CCE}$, there is further included that another ACK/NACK resource is obtained by adding a preset offset to the ACK/NACK resource.

Information about the predefined resource starting point of ACK/NACK corresponding to the second set of sub-frames can be received from the base station side.

Alternatively the predefined resource starting point of ACK/NACK corresponding to the second set of sub-frames can be obtained particularly as follows:

Information transmitted from the base station side about ACK/NACK resource reserved for a non-dynamic system user is received, and the information about the predefined configuration resource starting point of ACK/NACK is calculated in the formula of $F = N_{PUCCH}^{(1)} + \Delta_{R8}$, where $n_{PUCCH}^{(1)}$ is a predefined configuration resource starting point for the non-dynamic system user, $\Delta_{R8}$ is the ACK/NACK resource reserved for the non-dynamic system user, and F is the predefined resource starting point of ACK/NACK corresponding to the second set of sub-frames.

Here the information about the predefined resource starting point of ACK/NACK can be obtained in the formula of $$F = \begin{cases} M_{R8}N_n - (M_{R8} - k_{R8})(N_n - N_{n-1}) & n = 3 \\ M_{R8}N_n & n = 0, 1, 2; \end{cases}$$

Where F is the predefined resource starting point of ACK/NACK corresponding to the second set of sub-frames, $M_{R8}$ is the number of sub-frames in the P set of sub-frames, $k_{R8}$ is the number of special timeslots in the P set of sub-frames, $N_n$ is the number of CCEs carried in n PDCCH symbols, and n is the highest number of PDCCH occupied symbols in the P set of sub-frames.

Step 302: ACK/NACK information corresponding to the downlink data is transmitted over the ACK/NACK resource in the sub-frame n.

In the step 301, the flexible sub-frame information can be indicated by received higher layer signaling or obtained as prescribed.

Figure 4:
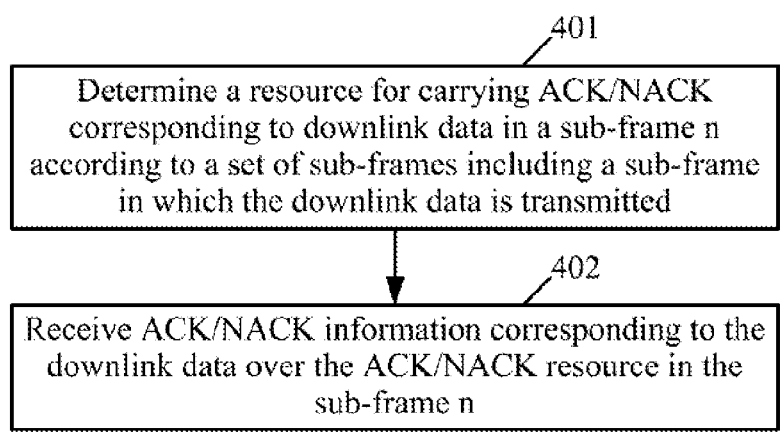
FIG. 4 is a schematic flow chart of a method of scheduling an uplink feedback of a user equipment in an embodiment of the invention.

Referring to FIG. 4, there is a method of scheduling an uplink feedback of a user equipment at the network side according to an embodiment of the invention, applicable to a system including a Physical Downlink Shared Channel (PDSCH) with Physical Downlink Control Channel (PDCCH) scheduling or a PDCCH indicating uplink Semi-Persistent Scheduling (SPS) resource releasing, the method particularly including the following steps:

Step 401: ACK/NACK resource, for carrying ACK/NACK corresponding to downlink data, in a sub-frame n is determined according to a set of sub-frames including a sub-frame in which the downlink data is transmitted.

(1) If the sub-frame in which the downlink data is transmitted belongs to a first set of sub-frames, then the ACK/NACK resource for carrying the ACK/NACK corresponding to the downlink data in the sub-frame n is determined according to a scheme and parameters corresponding to the first set of sub-frames; and (2) If the sub-frame in which the downlink data is transmitted belongs to a second set of sub-frames, then the ACK/NACK resource for carrying the ACK/NACK corresponding to the downlink data in the sub-frame n is determined according to a scheme and parameters corresponding to the second set of sub-frames.

In the case of (1), if the sub-frame in which the downlink data is transmitted belongs to the first set of sub-frames, then information about the ACK/NACK resource for carrying the ACK/NACK corresponding to the downlink data in the sub-frame n for the first set of sub-frames can be obtained using a PUCCH resource obtaining scheme and relevant parameters predefined for a non-dynamic system.

In the case (2), if the sub-frame in which the downlink data is transmitted belongs to the second set of sub-frames, then high layer signaling can be transmitted to a user equipment to indicate the information about the ACK/NACK resource for carrying the ACK/NACK corresponding to the downlink data in the sub-frame n for the second set of sub-frames.

For example, the higher layer signaling includes information about ACK/NACK resource, for carrying ACK/NACK in the corresponding sub-frame n, configured by a base station for a first sub-frame in the second set of sub-frames.

For example, the higher signaling includes information about ACK/NACK resource, for carrying ACK/NACK in the corresponding sub-frame n, configured by the base station for a part or all of the sub-frames in the second set of sub-frames.

In another embodiment, information about ACK/NACK resource, for carrying ACK/NACK, in the sub-frame n corresponding to each sub-frame in the second set of sub-frames can be obtained in a predefined configuration scheme.

An ACK/NACK resource is calculated in the predefined configuration scheme according to the index of a first CCE used for a Physical Downlink Control Channel (PDCCH), and the predefined configuration scheme includes:

$$n_{PUCCH,i}^{(1)} = F + (M_{dyn} - i - 1)N_p + iN_{p+1} + n_{CCE};$$

Where F is a predefined resource starting point of ACK/NACK corresponding to the second set of sub-frames, $M_{dyn}$ is the number of sub-frames in the second set of sub-frame, $n_{CCE}$ is the index of a first CCE, in a sub-frame $n - k_m$, used for a PDCCH, $N_p = \max \{0, \lfloor [N_{RB}^{DL} \times (N_{sc}^{RB} \times p - 4)]/36 \rfloor\}$ with $N_{RB}^{DL}$ being the number of downlink Physical Resource Blocks (PRBs), $N_{cs}^{RB}$ being the number of sub-carriers in a PRB, that is, 12, and p being a value in $\{0,1,2,3\}$, and $n_{PUCCH,i}^{(1)}$ is a ACK/NACK/SR resource index corresponding to the i-th sub-frame in the second set of sub-frames.

When the index of a CCE corresponds to multiple ACK/NACK resources, after an ACK/NACK resource is obtained in the formula of $n_{PUCCH,i}^{(1)} = F + (M_{dyn} - i - 1)N_p + iN_{p+1} + n_{CCE}$, there is further included that another ACK/NACK resource is obtained by adding a preset offset to the ACK/NACK resource.

Information about the predefined resource starting point of ACK/NACK corresponding to the second set of sub-frames can be obtained in the formula of:

$$F = N_{PUCCH,dynamic}^{(1)};$$

or $$F = N_{PUCCH}^{(1)} + \Delta_{R8};$$

or $$F = \begin{cases} M_{R8}N_n - (M_{R8} - k_{R8})(N_n - N_{n-1}) & n = 3 \\ M_{R8}N_n & n = 0, 1, 2; \end{cases}$$

Where F is the predefined resource starting point of ACK/NACK corresponding to the second set of sub-frames, $N_{PUCCH,dynamic}^{(1)}$ is the predefined resource starting point of ACK/NACK corresponding to the second set of sub-frames, $N_{PUCCH}^{(1)}$ is a predefined resource starting point of ACK/NACK for a non-dynamic system user, $\Delta_{R8}$ is ACK/NACK resource reserved for the non-dynamic system user, $M_{dyn}$ is the number of sub-frames in the P set of sub-frames, $M_{R8}$ is the number of sub-frames in the P set of sub-frames, $k_{R8}$ is the number of special timeslots in the P set of sub-frames, $N_n$ is the number of CCEs carried in n PDCCH symbols, and n is the highest number of PDCCH occupied symbols in the P set of sub-frames.

Further the highest number of PDCCH occupied symbols in the P set of sub-frames can be transmitted to the user equipment in higher layer signaling.

There is further included that the information about the resource starting point of ACK/NACK corresponding to the second set of sub-frames is transmitted to the user equipment so that the user equipment can obtain the resource starting point of ACK/NACK corresponding to the second set of sub-frames.

Step 402: ACK/NACK information corresponding to the downlink data is received over the ACK/NACK resource in the sub-frame n.

In the step 401, the information about the ACK/NACK resource for carrying the ACK/NACK in the corresponding sub-frame n for the first set of sub-frames is obtained in a PUCCH resource obtaining scheme predefined for a non-dynamic system.

The set of sub-frames includes the first set of sub-frames and/or the second set of sub-frames as in the previous method, and a repeated description thereof will be omitted here. The flexible sub-frame information is obtained by the base station itself under a preset rule or obtained as prescribed.

The technical solution of the invention will be detailed below in particular embodiments thereof.

1. In the situation of a PDSCH with PDCCH scheduling or a PDCCH indicating uplink SPS resource releasing, there is an ACK/NAC resource mapping scheme including two sets of sub-frames {S0, S1}, where S0 includes at least sub-frames included in both the set P and the set Q; and S1 includes only sub-frames included in only the set Q. The set P is determined according to the uplink/downlink sub-frame configuration information, and the set P includes the downlink sub-frames and/or the special sub-frames indicated by the uplink/downlink sub-frame configuration information; and the set Q is determined according to the flexible sub-frame information, and the set Q includes any one or more of the downlink sub-frames, the special sub-frames and the flexible sub-frames indicated by the flexible sub-frame information.

For example, the set P of sub-frames determined according to the uplink/downlink sub-frame configuration information is a set of sub-frames including the sub-frame n where the downlink data is transmitted in a non-dynamic system feedback scheme, and Q is a set of sub-frames including the sub-frame n where the downlink data is transmitted in a dynamic system feedback scheme, and ACK/NACK resources of both the sets P and Q are in the same sub-frame n. Table 3 and Table 4 depict two allocation schemes of feedback sets S0 and S1 respectively, where there is a determined dynamic HARQ feedback scheme by way of an example but without limitation thereto.

TABLE 3

Downlink association set index K: {k_0, k_1, ... k_{M-1}} for dynamicTDD

| Non-dynamic system uplink/downlink configuration | Sub-frame n | | | | | | | | | |
|---|---|---|---|---|---|---|---|---|---|---|
| | 0 | 1 | 2 | 3 | 4 | 5 | 6 | 7 | 8 | 9 |
| 0 | — | — | S0{6} S1{8, 7, 4} | — | — | — | — | S0{6} S1{8, 7, 4} | — | — |
| 1 | — | — | S0{7, 6} S1{8, 4} | — | — | — | — | S0{7, 6} S1{8, 4} | — | — |
| 2 | — | — | S0{8, 7, 4, 6} | — | — | — | — | S0{8, 7, 4, 6} | — | — |
| 3 | — | — | S0{7, 6} S1{8, 4} | — | — | — | — | S1{8, 7, 4, 6} | — | — |
| 4 | — | — | S0{x, 8, 7, x} S1{4, 6} | — | — | — | — | S1{8, 7, 4, 6} | — | — |
| 5 | — | — | S0{x, x, x, 8, 7, x, 4, x, 6} | — | — | — | — | S1{8, 7, 4, 6} | — | — |
| 6 | — | — | S0{7} S1{8, 6, 4} | — | — | — | — | S0{7} S1{8, 4, 6} | — | — |

TABLE 4

Downlink association set index K: {k_0, k_1, ... k_{M-1}} for dynamicTDD

| Non-dynamic system uplink/downlink configuration | Sub-frame n | | | | | | | | | |
|---|---|---|---|---|---|---|---|---|---|---|
| | 0 | 1 | 2 | 3 | 4 | 5 | 6 | 7 | 8 | 9 |
| 0 | — | — | S0{6} S1{8, 7, 4} | — | S0{4} | — | — | S0{6} S1{8, 7, 4} | — | S0{4} |
| 1 | — | — | S0{7, 6} S1{8, 4} | S0{4} | — | — | — | S0{7, 6} S1{8, 4} | S0{4} | — |
| 2 | — | — | S0{8, 7, 4, 6} | — | — | — | — | S0{8, 7, 4, 6} | — | — |
| 3 | — | — | S0{7, 6, 11} S1{8, 4} | S0{6, 5} | S0{5, 4} | — | — | S1{8, 7, 4, 6} | — | — |
| 4 | — | — | S0{12, 8, 7, 11} S1{4, 6} | S0{6, 5, 4, 7} | — | — | — | S1{8, 7, 4, 6} | — | — |
| 5 | — | — | S0{13, 12, 9, 8, 7, 5, 4, 11, 6} | — | — | — | — | S1{8, 7, 4, 6} | — | — |
| 6 | — | — | S0{7} S1{8, 6, 4} | S0{7} | S0{5} | — | — | S0{7} S1{8, 4, 6} | S0{7} | — |

2. S0 includes at least sub-frames included in both the set P and the set Q, and information about ACK/NACK resource, for carrying ACK/NACK for S0, in a corresponding sub-frame n is obtained in a PUCCH resource obtaining scheme predefined for an exiting non-dynamic system.

If S0 includes only sub-frames included in both the set P and the set Q as depicted in Table in 3, then a user of a non-dynamic system release is treated as in the prior art, that is, calculation is performed according to the set of sub-frames defined in Table 1 and the mapping relationship between $n_{PUCCH,i}^{(1)}$ and $n_{CCE,i}$ ($n_{PUCCH,i}^{(1)} = (M-i-1) \times N_p + i \times N_{p+1} + n_{CCE,i} + N_{PUCCH}^{(1)}$). For a user of a dynamic release, calculation is performed according to the set of sub-frames defined by S0 in Table 3 and the mapping relationship between $n_{PUCCH,i}^{(1)}$ and $n_{CCE,i}$ ($n_{PUCCH,i}^{(1)} = (M-i-1) \times N_p + i \times N_{p+1} + n_{CCE,i} + N_{PUCCH}^{(1)}$), where "x" in the set S0 is a placeholder with a corresponding position at which there is no sub-frame for which a feedback is required. The purpose of the placeholder is to ensure that the same sub-frames in S0 as P are also ordered consistently in a feedback set.

Figure 5A:
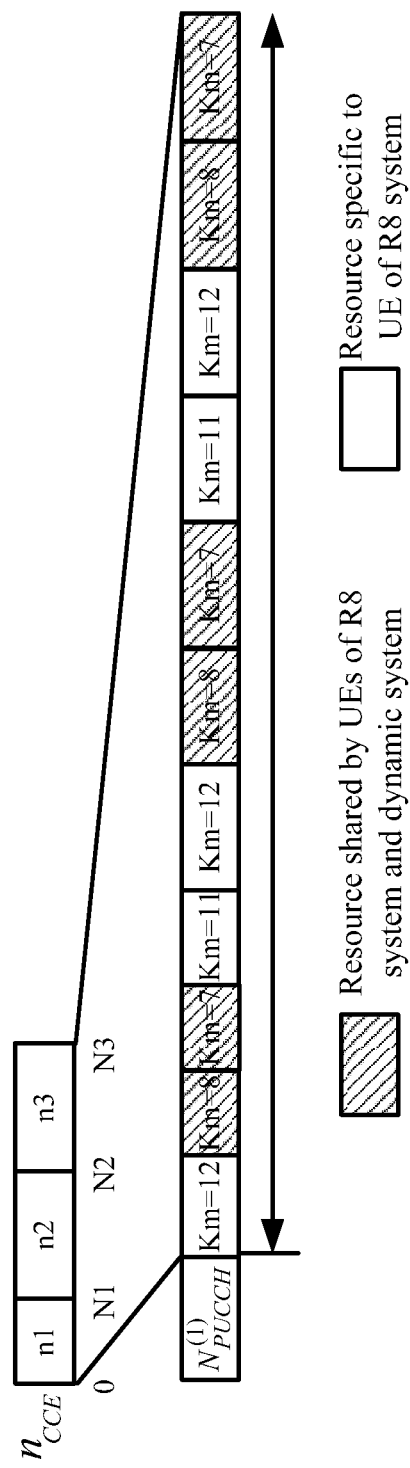
FIG. 5a is a schematic diagram of a PUCCH resource allocation 1 in an embodiment of the invention.

If S0 includes the set P, then for a user of a non-dynamic system release, calculation is performed according to the set of sub-frames defined by S0 in Table 4 and the mapping relationship between $n_{PUCCH,i}^{(1)}$ and $n_{CCE,i}$ ($n_{PUCCH,i}^{(1)} = (M-i-1) \times N_p + i \times N_{p+1} + n_{CCE,i} + N_{PUCCH}^{(1)}$). For a user of a dynamic release, not all the sub-frames in S0 are sub-frames corresponding to the HARQ scheme of the dynamic system, so it is only necessary to calculate ACK/NACK resource index $n_{PUCCH,i}^{(1)}$ for the sub-frames included in the HARQ scheme of the dynamic system. However the calculation scheme, particularly ordering of these sub-frames, is total the same as the non-dynamic system 3. S1 includes only sub-frames included in only the set Q, and an ACK/NACK mapping scheme of the sub-frames in the S1 set includes but will not be limited to the following one or more schemes:

(1) FIG. 5a illustrates an example of the entire scheme in which a base station itself configures an ACK/NACK resource corresponding to a sub-frame in the S1 xset, where the configuration 4 is used for a non-dynamic system user, and the configuration 2 is used for a dynamic user. In FIG. 5a, PUCCH resources of Km=8 and Km=7 are shared resources of the non-dynamic system and dynamic system UEs, that is, an ACK/NACK resource section in the sub-frame n corresponding to the S0 set, which is a PUCCH resource section illustrated here; and PUCCH resources of Km=1 and Km=12 are resources specific to the non-dynamic system UE, and $N_{PUCCH}^{(1)}$ identifies a section of PUCCH resources for transmitting ACK/NACK indicated by higher layer signaling, that is, a PUCCH resource section corresponding to the S1 set in this method.

(a) The base station configures each sub-frame in the S1 set with a corresponding ACK/NACK resource in the sub-frame n to carry ACK/NACK information and notifies the user equipment in higher layer signaling, where a higher layer signaling notification scheme includes but will not be limited to the following scheme:

For example, a piece of $n_{PUCCH,initial}^{(1)}$ information is transmitted to indicate a PUCCH resource corresponding to a first sub-frame in the S1 set; and PUCCH resources corresponding to subsequent sub-frames are indexed by adding 1, 2, ..., M−1 offsets sequentially to the initial $n_{PUCCH,initial}^{(1)}$, that is, $n_{PUCCH,k}^{(1)} = n_{PUCCH,initial}^{(1)} + (n-1)\Delta_{offset}$, where $\Delta_{offset}$ can be any positive integer. In order to avoid resource fragments, $\Delta_{offset}=1$ is recommended. $\Delta_{offset}=1$ can be notified in higher layer signaling or specified in the protocol.

For example, M $n_{PUCCH,k}^{(1)}$ are transmitted, where M is the number of sub-frames in the S1 set or the highest number of sub-frames in the S1 set. A correspondence relationship of $n_{PUCCH,k}^{(1)}$ with the sub-frames in the S1 set can be obtained under a prescribed rule, for example, the n-th $n_{PUCCH,n}^{(1)}$ corresponds to the n-th sub-frame in a feedback window set 1. Or the correspondence relationship of the sub-frames with $n_{PUCCH,k}^{(1)}$ can be specified by PDCCHs of the sub-frames.

(b) The base station configures ACK/NACK resources for the sub-frames included in the S0 and S1 sets and notifies the user equipment in higher layer signaling, where a higher layer signaling notification scheme includes but will not be limited to the following scheme:

For example, M $n_{PUCCH,k}^{(1)}$ are transmitted, where M is the number of sub-frames in the S1 set or the highest number of sub-frames in the S1 set or the highest one of the numbers of sub-frames in sets of sub-frames corresponding to the sub-frame n in all the uplink/downlink configurations. A correspondence relationship of the sub-frames with $n_{PUCCH,k}^{(1)}$ can be specified by PDCCHs of the sub-frames.

In the foregoing method, different users can be allocated with separate resources or overlapping resources.

(2) Predefined Configuration Scheme

A PUCCH resource corresponding to the i-th sub-frame in the S1 set is:

$n_{PUCCH,i}^{(1)} = F + (M_{dyn} - i - 1)N_p + iN_{p+1} + n_{CCE}$, where F is ACK/NACK resource corresponding to the second set of sub-frames, $M_{dyn}$ is the number of sub-frames in the second set of sub-frame, $n_{CCE}$ is the index of a first CCE, in a sub-frame n−$k_m$, used for a PDCCH, $N_p = \max\{0, \lfloor [N_{RB}^{DL} \times (N_{sc}^{RB} \times p - 4)]/36 \rfloor\}$ with $N_{RB}^{DL}$ being the number of downlink PRBs, $N_{sc}^{RB}$ being the number of sub-carriers in a PRB, that is, 12, and p being a value in $\{0,1,2,3\}$, and $n_{PUCCH,i}^{(1)}$ is an ACK/NACK/SR resource index corresponding to the i-th sub-frame in the second set of sub-frames.

For a PUCCH in a multi-port transmission mode, a PUCCH resource of the second antenna port is indexed by adding a preset offset, e.g., 1, to a PUCCH resource of the first antenna port, that is, $n_{PUCCH,i}^{(1)} = F + (M_{dyn} - i - 1)N_p + iN_{p+1} + n_{CCE} + 1$;

Moreover for two aggregated carriers and the current sub-frame for an ACK/NACK feedback corresponding to only one downlink sub-frame, for the carrier in a multi-codeword transmission mode, a PUCCH resource corresponding to the second codeword is indexed by adding a preset offset, e.g., 1, to a PUCCH resource corresponding to the first codeword, that is, $n_{PUCCH,i}^{(1)} = F + (M_{dyn} - i - 1)N_p + iN_{p+1} + n_{CCE} + 1$.

Figure 5B:
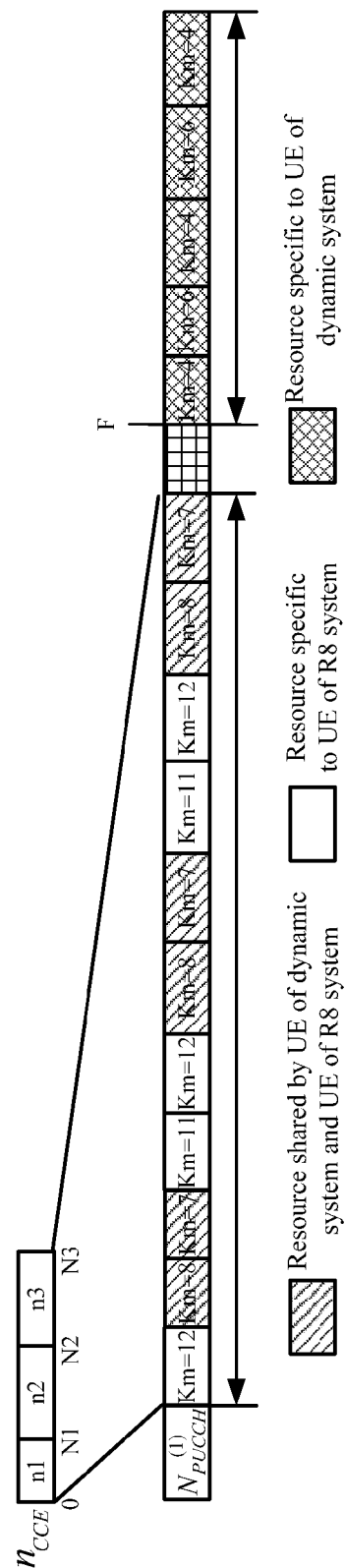
FIG. 5b is a schematic diagram of a PUCCH resource allocation 2 in an embodiment of the invention.

FIG. 5b illustrates the entire pre-configured ACK/NACK resource mapping scheme in which there are two PUCCH resource allocations (the configuration 4 is used for a non-dynamic system user and the configuration 2 is used for a dynamic user). In FIG. 5a, PUCCH resources of Km=8 and Km=7 are PUCCH resources in the sub-frame n corresponding to the S0 set, PUCCH resources of Km=11 and Km=12 are resources specific to the non-dynamic system UE, and PUCCH resources of Km=4 and Km=6 are PUCCH resources in the sub-frame n corresponding to the S1 set, which start with F.

Where F is configured and notified as follows:

The base station itself configures F and notifies the user equipment in higher layer signaling, where F= $N_{PUCCH,dynamic}^{(1)}$, that is, the user equipment is notified directly of information about a predefined resource starting point of ACK/NACK corresponding to the second set of sub-frames, or $F = N_{PUCCH}^{(1)} + \Delta_{R8}$, where the base stations configures F as predefined, that is, $$F = \begin{cases} M_{R8}N_n - (M_{R8} - k_{R8})(N_n - N_{n-1}) & n = 3 \\ M_{R8}N_n & n = 0, 1, 2, \end{cases}$$

Where F is the predefined resource starting point of ACK/NACK corresponding to the second set of sub-frames, $N_{PUCCH,dynamic}^{(1)}$ is the predefined resource starting point of ACK/NACK corresponding to the second set of sub-frames, $N_{PUCCH}^{(1)}$ is a predefined resource starting point of ACK/NACK for the non-dynamic system user, $\Delta_{R8}$ is ACK/NACK resource reserved for the non-dynamic system user, $M_{dyn}$ is the number of sub-frames in the P set of sub-frames, $M_{R8}$ is the number of sub-frames in the P set of sub-frames, $k_{R8}$ is the number of special timeslots in the P set of sub-frames, $N_n$ is the number of CCEs carried in n PDCCH symbols, and n is the highest number of PDCCH occupied symbols in the P set of sub-frames, for example, n=3.

Figure 6:
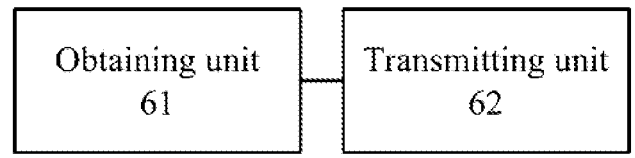
FIG. 6 is a schematic structural diagram of an uplink feedback apparatus an in an embodiment of the invention.

Referring to FIG. 6, an uplink feedback apparatus of this embodiment includes:

An obtaining unit 61 is configured to determine ACK/NACK resource, for carrying ACK/NACK corresponding to downlink data, in a sub-frame n according to a set of sub-frames including a sub-frame in which the downlink data is received; and A transmitting unit 62 is configured to transmit ACK/NACK information corresponding to the downlink data over the ACK/NACK resource in the sub-frame n.

Where the set of sub-frames includes a first set of sub-frames and/or a second set of sub-frames; the first set of sub-frames and/or the second set of sub-frames are/is determined by obtained uplink/downlink sub-frame configuration information and flexible sub-frame information; the uplink/downlink sub-frame configuration information indicates the type of each sub-frame in a radio frame, and corresponding types of sub-frames include uplink sub-frames, downlink sub-frames and special sub-frames; and the flexible sub-frame information indicates the type of each sub-frame in a radio frame, and corresponding types of sub-frames include uplink sub-frames, downlink sub-frames, special sub-frames and flexible sub-frames, where the flexible sub-frame can be used for transmission of uplink or downlink data.

The first set of sub-frames includes at least all the sub-frames belonging to both a set P and a set Q; and the second set of sub-frames includes all the sub-frames belonging to the set Q but not the set P, where:

The obtaining unit 61 determines the set P according to the uplink/downlink sub-frame configuration information, and the set P includes the downlink sub-frames and/or the special sub-frames indicated by the uplink/downlink sub-frame configuration information; and The obtaining unit 61 determines the set Q according to the flexible sub-frame information, and the set Q includes any one or more of the downlink sub-frames, the special sub-frames and the flexible sub-frames indicated by the flexible sub-frame information.

The obtaining unit 61 is configured to obtain the flexible sub-frame information indicated by received higher layer signaling or obtain the flexible sub-frame information as prescribed.

The obtaining unit 61 is configured to determine the ACK/NACK resource for carrying the ACK/NACK corresponding to the downlink data in the sub-frame n according to a scheme and parameters corresponding to the first set of sub-frames in the case that the sub-frame in which the downlink data is received belongs to the first set of sub-frames; and To determine the ACK/NACK resource for carrying the ACK/NACK corresponding to the downlink data in the sub-frame n according to a scheme and parameters corresponding to the second set of sub-frames in the case that the sub-frame in which the downlink data is received belongs to the second set of sub-frames.

The obtaining unit 61 is configured to obtain the information about the ACK/NACK resource for carrying the ACK/NACK corresponding to the downlink data in the sub-frame n for the first set of sub-frames using a PUCCH resource obtaining scheme and relevant parameters predefined for a non-dynamic system in the case that the sub-frame in which the downlink data is received belongs to the first set of sub-frames; and To obtain the information about the ACK/NACK resource for carrying the ACK/NACK corresponding to the downlink data in the sub-frame n for the second set of sub-frames by receiving higher layer signaling transmitted from a base station in the case that the sub-frame in which the downlink data is received belongs to the second set of sub-frames.

The higher layer signaling includes information about ACK/NACK resource, for carrying ACK/NACK in the corresponding sub-frame n, configured by the base station for a first sub-frame in the second set of sub-frames, and Then the obtaining unit 61 obtains information about ACK/NACK resource, in the sub-frame n, for carrying ACK/NACK corresponding to a subsequent sub-frame in the second set of sub-frames according to the ACK/NACK resource, in the sub-frame n configured for the first sub-frame and a preset offset by which the sub-frames are spaced.

The higher signaling includes information about ACK/NACK resource, for carrying ACK/NACK in the corresponding sub-frame n, configured by the base station for a part or all of the sub-frames in the second set of sub-frames.

The obtaining unit 61 is configured to obtain information about ACK/NACK resource, in the sub-frame n, for carrying ACK/NACK corresponding to each sub-frame in the second set of sub-frames in a predefined configuration scheme if the sub-frame in which the downlink data is received belongs to the second set of sub-frames.

The obtaining unit 61 is configured to calculate an ACK/NACK resource in the predefined configuration scheme according to the index of a first CCE used for a PDCCH, and the predefined configuration scheme includes:

$$n_{PUCCH,i}^{(1)} = F + (M_{dyn} - i - 1)N_p + iN_{p+1} + n_{CCE};$$

Where F is a predefined resource starting point of ACK/NACK corresponding to the second set of sub-frames, $M_{dyn}$ is the number of sub-frames in the second set of sub-frame, $n_{CCE}$ is the index of a first CCE, in a sub-frame $n-k_m$, used for a PDCCH, $N_p = \max\{0, \lfloor [N_{RB}^{DL} \times (N_{sc}^{RB} \times p - 4)]/36 \rfloor\}$ with $N_{RB}^{DL}$ being the number of downlink PRBs, $N_{sc}^{RB}$ being the number of sub-carriers in a PRB, that is, 12, and p being a value in $\{0,1,2,3\}$, and $n_{PUCCH,i}^{(1)}$ is an ACK/NACK/SR resource index corresponding to the i-th sub-frame in the second set of sub-frames.

The obtaining unit 61 is configured, when the index of a CCE corresponds to multiple ACK/NACK resources, after obtaining an ACK/NACK resource in the formula of $n_{PUCCH,i}^{(1)} = F + (M_{dyn} - i - 1)N_p + iN_{p+1} + n_{CCE}$, to further obtain another ACK/NACK resource by adding a preset offset to the ACK/NACK resource.

The obtaining unit 61 receives information transmitted from the base station side about the predefined resource starting point of ACK/NACK corresponding to the second set of sub-frames.

The obtaining unit 61 obtains the predefined resource starting point of ACK/NACK corresponding to the second set of sub-frames as follows:

Information transmitted from the base station side about ACK/NACK resource reserved for a non-dynamic system user is received; and The information about the predefined configuration resource starting point of ACK/NACK is calculated in the formula of $F = N_{PUCCH}^{(1)} + \Delta_{R8}$, Where $n_{PUCCH}^{(1)}$ is a predefined configuration resource starting point for the non-dynamic system user, $\Delta_{R8}$ is the ACK/NACK resource reserved for the non-dynamic system user, and F is the predefined resource starting point of ACK/NACK corresponding to the second set of sub-frames.

The information about the predefined resource starting point of ACK/NACK is obtained in the formula of:

$$F = \begin{cases} M_{R8}N_n - (M_{R8} - k_{R8})(N_n - N_{n-1}) & n = 3 \\ M_{R8}N_n & n = 0, 1, 2; \end{cases}$$

Where F is the predefined resource starting point of ACK/NACK corresponding to the second set of sub-frames, $M_{R8}$ is the number of sub-frames in the P set of sub-frames, $k_{R8}$ is the number of special timeslots in the P set of sub-frames, $N_n$ is the number of CCEs carried in n PDCCH symbols, and n is the highest number of PDCCH occupied symbols in the P set of sub-frames.

The highest number of PDCCH occupied symbols in the P set of sub-frames is indicated directly by higher layer signaling or configured by default.

The apparatus is applicable to applicable to a system including a Physical Downlink Shared Channel (PDSCH) with Physical Downlink Control Channel (PDCCH) scheduling or a PDCCH indicating uplink Semi-Persistent Scheduling (SPS) resource releasing.

Figure 7:
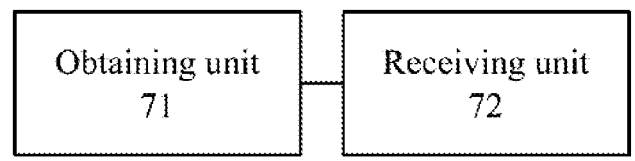
FIG. 7 is a schematic structural diagram of an apparatus for scheduling an uplink feedback of a user equipment in an embodiment of the invention.

Referring to FIG. 7, an apparatus for scheduling an uplink feedback of a user equipment according to this embodiment can be a user equipment and particularly include an obtaining unit 71 and a receiving unit 72.

The obtaining unit 71 is configured to determine ACK/NACK resource for carrying ACK/NACK corresponding to downlink data in a sub-frame n according to a set of sub-frames including a sub-frame in which the downlink data is transmitted; and The receiving unit 72 is configured to receive ACK/NACK information corresponding to the downlink data over the ACK/NACK resource in the sub-frame n.

The set of sub-frames includes the first set of sub-frames and/or the second set of sub-frames as in the previous method, and a repeated description thereof will be omitted here.

The first set of sub-frames includes at least al the sub-frames belonging to both a set P and a set Q; and the second set of sub-frames includes all the sub-frames belonging to the set Q but not the set P, where:

The obtaining unit determines the set P according to the uplink/downlink sub-frame configuration information, and the set P includes the downlink sub-frames and/or the special sub-frames indicated by the uplink/downlink sub-frame configuration information; and The obtaining unit determines the set Q according to the flexible sub-frame information, and the set Q includes any one or more of the downlink sub-frames, the special sub-frames and the flexible sub-frames indicated by the flexible sub-frame information.

The obtaining unit 71 is configured to obtain the flexible sub-frame information by the apparatus itself under a preset rule or obtain the flexible sub-frame information as prescribed.

The obtaining unit 71 is configured to determine the ACK/NACK resource for carrying the ACK/NACK corresponding to the downlink data in the sub-frame n according to a scheme and parameters corresponding to the first set of sub-frames in the case that the sub-frame in which the downlink data is transmitted belongs to the first set of sub-frames; and to determine the ACK/NACK resource for carrying the ACK/NACK corresponding to the downlink data in the sub-frame n according to a scheme and parameters corresponding to the second set of sub-frames in the case that the sub-frame in which the downlink data is transmitted belongs to the second set of sub-frames.

The obtaining unit 71 is configured to obtain the information about the ACK/NACK resource for carrying the ACK/NACK corresponding to the downlink data in the sub-frame n for the first set of sub-frames using a PUCCH resource obtaining scheme and relevant parameters predefined for a non-dynamic system in the case that the sub-frame in which the downlink data is transmitted belongs to the first set of sub-frames.

The apparatus further includes: a first transmitting unit configured to transmit high layer signaling transmitted to a user equipment to indicate the information about the ACK/NACK resource for carrying the ACK/NACK corresponding to the downlink data in the sub-frame n for the second set of sub-frames.

The higher layer signaling includes information about ACK/NACK resource, for carrying ACK/NACK in the corresponding sub-frame n, configured by a base station for a first sub-frame in the second set of sub-frames.

The higher signaling includes information about ACK/NACK resource, for carrying ACK/NACK in the corresponding sub-frame n, configured by the base station for a part or all of the sub-frames in the second set of sub-frames.

The obtaining unit 71 is configured to obtain information about ACK/NACK resource, in the sub-frame n, for carrying ACK/NACK corresponding to each sub-frame in the second set of sub-frames in a predefined configuration scheme.

The obtaining unit 71 is configured to calculate an ACK/NACK resource in the predefined configuration scheme according to the index of a first CCE used for a Physical Downlink Control Channel (PDCCH), and the predefined configuration scheme includes:

$$n_{PUCCH,i}^{(1)} = F + (M_{dyn} - i - 1)N_p + iN_{p+1} + n_{CCE};$$

Where F is a predefined resource starting point of ACK/NACK corresponding to the second set of sub-frames, $M_{dyn}$ is the number of sub-frames in the second set of sub-frame, $n_{CCE}$ is the index of a first CCE, in a sub-frame $n-k_m$, used for a PDCCH, $N_p = \max\{0, \lfloor [N_{RB}^{DL} \times (N_{sc}^{RB} \times p - 4)]/36 \rfloor\}$ with $N_{RB}^{DL}$ being the number of downlink PRBs, $N_{sc}^{RB}$ being the number of sub-carriers in a PRB, that is, 12, and p being a value in $\{0,1,2,3\}$, and $n_{PUCCH,i}^{(1)}$ is a ACK/NACK/SR resource index corresponding to the i-th sub-frame in the second set of sub-frames.

The obtaining unit 71 is configured, when the index of a CCE corresponds to multiple ACK/NACK resources, after obtaining an ACK/NACK resource in the formula of $n_{PUCCH,i}^{(1)} = F + (M_{dyn} - i - 1)N_p + iN_{p+1} + n_{CCE}$, to further obtain another ACK/NACK resource is obtained by adding a preset offset to the ACK/NACK resource.

Information about the predefined resource starting point of ACK/NACK corresponding to the second set of sub-frames can be obtained in the formula of:

$$F = N_{PUCCH,dynamic}^{(1)};$$

or $$F = N_{PUCCH}^{(1)} + \Delta_{R8};$$

or $$F = \begin{cases} M_{R8} N_n - (M_{R8} - k_{R8})(N_n - N_{n-1}) & n = 3 \\ M_{R8} N_n & n = 0, 1, 2; \end{cases}$$

Where F is the predefined resource starting point of ACK/NACK corresponding to the second set of sub-frames, $N_{PUCCH,dynamic}^{(1)}$ is the predefined resource starting point of ACK/NACK corresponding to the second set of sub-frames, $N_{PUCCH}^{(1)}$ is a predefined resource starting point of ACK/NACK for a non-dynamic system user, $\Delta_{R8}$ is ACK/NACK resource reserved for the non-dynamic system user, $M_{dyn}$ is the number of sub-frames in the P set of sub-frames, $M_{R8}$ is the number of sub-frames in the P set of sub-frames, $k_{R8}$ is the number of special timeslots in the P set of sub-frames, $N_n$ is the number of CCEs carried in n PDCCH symbols, and n is the highest number of PDCCH occupied symbols in the P set of sub-frames.

The first transmitting unit is further configured to transmit the highest number of PDCCH occupied symbols in the P set of sub-frames to the user equipment in higher layer signaling.

The apparatus further includes: a second transmitting unit configured to transmit the information about the resource starting point of ACK/NACK corresponding to the second set of sub-frames to the user equipment side.

The apparatus is applicable to applicable to a system including a Physical Downlink Shared Channel (PDSCH) with Physical Downlink Control Channel (PDCCH) scheduling or a PDCCH indicating uplink Semi-Persistent Scheduling (SPS) resource releasing.

Figure 8:
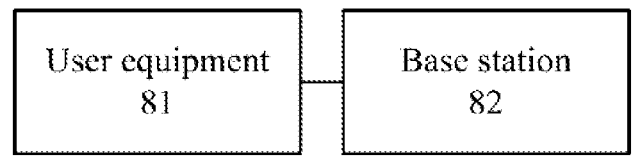
FIG. 8 is a schematic structural diagram of a system in an embodiment of the invention.

Referring to FIG. 8, a communication system according to this embodiment includes:

A user equipment 81 is configured to determine ACK/NACK resource for carrying ACK/NACK corresponding to downlink data in a sub-frame n according to a set of sub-frames including a sub-frame in which the downlink data is received; and to transmit ACK/NACK information corresponding to the downlink data over the ACK/NACK resource in the sub-frame n; and A base station 82 is configured to determine the ACK/NACK resource for carrying the ACK/NACK corresponding to the downlink data in the sub-frame n according to the set of sub-frames including the sub-frame in which the downlink data is transmitted; and to receive the ACK/NACK information corresponding to the downlink data over the ACK/NACK resource in the sub-frame n. The set of sub-frames includes the first set of sub-frames and/or the second set of sub-frames as in the previous method, and a repeated description thereof will be omitted here.

The user equipment of this embodiment can include the foregoing interaction process between the base station side and the user equipment side or the interaction process between the two apparatuses in FIG. 6 and FIG. 7, and a repeated description thereof will be omitted here.

In this embodiment, the uplink/downlink sub-frame configuration information indicates the type of each sub-frame in a radio frame, and corresponding types of sub-frames include uplink sub-frames, downlink sub-frames and special sub-frames; and the flexible sub-frame information indicates the type of each sub-frame in a radio frame, and corresponding types of sub-frames include uplink sub-frames, downlink sub-frames, special sub-frames and flexible sub-frames, where the flexible sub-frame can be used for transmission of uplink or downlink data. The uplink/downlink sub-frame configuration information configures the information about the ACK/NACK resource for carrying the ACK/NACK corresponding to the downlink data in the first set of sub-frames, that is, a downlink sub-frame included in both a non-dynamic system feedback scheme and a dynamic system feedback scheme, and the flexible sub-frame information configures the information about the ACK/NACK resource for carrying the ACK/NACK corresponding to the downlink data in the second set of sub-frames, so confliction of PUCCH resources between the non-dynamic system and the dynamic system can be avoided.

The information about the corresponding PUCCH resource for carrying ACK/NACK in the first set of sub-frames (the sub-frames included in both the set P and the set Q) can be obtained in a PUCCH resource obtaining scheme predefined for the non-dynamic system without any problem of PUCCH resource confliction while saving the resources. For a sub-frame included in only the set Q, the index thereof is different from the index of the ACK/NACK resource for feeding back ACK/NACK information in the non-dynamic system, thus avoiding confliction of resources between the non-dynamic system and the dynamic system from occurring.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and al the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. An uplink feedback method, the method comprising:
   determining Acknowledgement (ACK)/Non-Acknowledgement (NACK) resource, for carrying ACK/NACK corresponding to downlink data, in a sub-frame n according to a set of sub-frames including a sub-frame in which the downlink data is received; and
   transmitting ACK/NACK information corresponding to the downlink data over the ACK/NACK resource in the sub-frame n,
   wherein the set of sub-frames includes a first set of sub-frames and/or a second set of sub-frames; the first set of sub-frames and/or the second set of sub-frames are/is determined by obtained uplink/downlink sub-frame configuration information and flexible sub-frame information; the uplink/downlink sub-frame configuration information indicates the type of each sub-frame in a radio frame, and corresponding types of sub-frames include uplink sub-frames, downlink sub-frames and special sub-frames; and the flexible sub-frame information indicates the type of each sub-frame in a radio frame, and corresponding types of sub-frames include uplink sub-frames, downlink sub-frames, special sub-frames and flexible sub-frames, wherein the flexible sub-frames can be used for transmission of uplink or downlink data, and n is a sub-frame number,
   wherein the first set of sub-frames includes at least all the sub-frames belonging to both a set P and a set Q; and the second set of sub-frames includes all the sub-frames belonging to the set Q but not the set P, wherein:

the set P is determined according to the uplink/downlink sub-frame configuration information, and the set P includes the downlink sub-frames and/or the special sub-frames indicated by the uplink/downlink sub-frame configuration information; and the set Q is determined according to the flexible sub-frame information, and the set Q includes any one or more of the downlink sub-frames, the special sub-frames and the flexible sub-frames indicated by the flexible sub-frame information.

2. The method according to claim 1, wherein the flexible sub-frame information is indicated by received higher layer signaling or obtained as prescribed.

3. The method according to claim 1, wherein determining ACK/NACK resource, for carrying ACK/NACK corresponding to downlink data, in a sub-frame n according to a set of sub-frames including a sub-frame in which the downlink data is received comprises:

if the sub-frame in which the downlink data is received belongs to the first set of sub-frames, then determining the ACK/NACK resource, for carrying the ACK/NACK corresponding to the downlink data, in the sub-frame n according to a scheme and parameters corresponding to the first set of sub-frames; and if the sub-frame in which the downlink data is received belongs to the second set of sub-frames, then determining the ACK/NACK resource, for carrying the ACK/NACK corresponding to the downlink data, in the sub-frame n according to a scheme and parameters corresponding to the second set of sub-frames.

4. The method according to claim 3, wherein if the sub-frame in which the downlink data is received belongs to the first set of sub-frames, then the information about the ACK/NACK resource, for carrying the ACK/NACK corresponding to the downlink data, in the sub-frame n for the first set of sub-frames is obtained using a Physical Uplink Control Channel (PUCCH) resource obtaining scheme and relevant parameters predefined for a non-dynamic system.

5. The method according to claim 3, wherein if the sub-frame in which the downlink data is received belongs to the second set of sub-frames, then the information about the ACK/NACK resource, for carrying the ACK/NACK corresponding to the downlink data, in the sub-frame n for the second set of sub-frames is obtained by receiving higher layer signaling transmitted from a base station.

6. The method according to claim 5, wherein the higher layer signaling includes information about ACK/NACK resource, for carrying ACK/NACK in the corresponding sub-frame n, configured by the base station for a first sub-frame in the second set of sub-frames, and then information about ACK/NACK resource, in the sub-frame n, for carrying ACK/NACK corresponding to a subsequent sub-frame in the second set of sub-frames is obtained according to the ACK/NACK resource, in the sub-frame n, configured for the first sub-frame and a preset offset by which the sub-frames are spaced:

or the higher signaling includes information about ACK/NACK resource, for carrying ACK/NACK in the corresponding sub-frame n, configured by the base station for a part or all of the sub-frames in the second set of sub-frames.

7. The method according to claim 3, wherein if the sub-frame in which the downlink data is received belongs to the second set of sub-frames, then information about ACK/NACK resource, in the sub-frame n, for carrying ACK/NACK corresponding to each sub-frame in the second set of sub-frames is obtained in a predefined configuration scheme; and the predefined configuration scheme includes:

$$n_{PUCCH,i}^{(1)} = F + (M_{dyn} - i - 1)N_p + iN_{p+1} + n_{CCE};$$

wherein F is a predefined resource starting point of ACK/NACK corresponding to the second set of sub-frames, $M_{dyn}$ is the number of sub-frames in the second set of sub-frame, $n_{CCE}$ is the index of a first CCE, in a sub-frame $n-k_m$, used for a PDCCH, $N_p = \max\{0, \lfloor [N_{RB}^{DL} \times (N_{sc}^{RB} \times p - 4)]/36 \rfloor\}$ with $N_{RB}^{DL}$ being the number of downlink Physical Resource Blocks, PRBs, $N_{sc}^{RB}$ being the number of sub-carriers in a PRB, that is, 12, and p being a value in $\{0,1,2,3\}$, and $n_{PUCCH,i}^{(1)}$ is an ACK/NACK/uplink Scheduling Request, SR, resource index corresponding to the i-th sub-frame in the second set of sub-frames; and when the index of a CCE corresponds to multiple ACK/NACK resources, after obtaining an ACK/NACK resource in the formula of $n_{PUCCH,i}^{(1)} = F + (M_{dyn} - i - 1)N_p + iN_{p+1} + n_{CCE}$, another ACK/NACK resource is further obtained by adding a preset offset to the ACK/NACK resource.

8. The method according to claim 7, wherein information about the predefined resource starting point of ACK/NACK corresponding to the second set of sub-frames is obtained as follows:

the information transmitted from the base station side about the predefined resource starting point of ACK/NACK corresponding to the second set of sub-frames is received;

or information transmitted from the base station side about ACK/NACK resource reserved for a non-dynamic system user is received; and the information about the predefined configuration resource starting point of ACK/NACK is calculated in the formula of $F = N_{PUCCH}^{(1)} + \Delta_{R8}$, wherein $n_{PUCCH}^{(1)}$ is a predefined configuration resource starting point for the non-dynamic system user, $\Delta_{K8}$ is the ACK/NACK resource reserved for the non-dynamic system user, and F is the predefined resource starting point of ACK/NACK corresponding to the second set of sub-frames;

or $$F = \begin{cases} M_{R8}N_n - (M_{R8} - k_{R8})(N_n - N_{n-1}) & n = 3 \\ M_{R8}N_n & n = 0, 1, 2; \end{cases}$$

wherein F is the predefined resource starting point of ACK/NACK corresponding to the second set of sub-frames, $M_{R8}$ is the number of sub-frames in the P set of sub-frames, $k_{R8}$ is the number of special timeslots in the P set of sub-frames, $N_n$ is the number of CCEs carried in n PDCCH symbols, and n is the highest number of PDCCH occupied symbols in the P set of sub-frames.

9. The method according to claim 8, wherein the highest number of PDCCH occupied symbols in the P set of sub-frames is indicated directly by higher layer signaling or configured by default.

10. A method of scheduling an uplink feedback of a user equipment, applicable to a dynamic sub-frame system, the method comprising:

determining ACK/NACK resource, for carrying ACK/NACK corresponding to downlink data, in a sub-frame n according to a set of sub-frames including a sub-frame in which the downlink data is transmitted; and receiving ACK/NACK information corresponding to the downlink data over the ACK/NACK resource in the sub-frame n, wherein the set of subframe n includes a first set of sub-frames and/or a second set of sub-frames; the first set of sub-frames and/or the second, set of sub-frames are/is determined by obtained uplink/downlink sub-frame configuration information and flexible sub-frame information; the uplink/downlink sub-frame configuration information indicates the type of each sub-frame in a radio frame, and corresponding types of sub-frames include uplink sub-frames, downlink sub-frames and special sub-frames; and the flexible sub-frame information indicates the type of each sub-frame in radio frame, and corresponding types of sub-frames include uplink sub-frames, downlink sub-frames, special sub-frames and flexible sub-frames, wherein the flexible sub-frame can be used for transmission of uplink or downlink data, and n is a sub-frame number, wherein the first set of sub-frames includes at least all the sub-frames belonging to both a set P and a set Q; and the second set of sub-frames includes all the sub-frames belonging to the set Q but not the set P, wherein:

the set P is determined according to the uplink/downlink sub-frame configuration information, and the set P includes the downlink sub-frames and/or the special sub-frames indicated by the uplink/downlink sub-frame configuration information; and the set Q is determined according to the flexible sub-frame information, and the set Q includes any one or more of the downlink sub-frames, the special sub-frames and the flexible sub-frames indicated by the flexible sub-frame information.

11. The method according to claim 10, wherein the flexible sub-frame information is obtained by the apparatus itself under a preset rule or obtained as prescribed.

12. The method according to claim 10, wherein determining ACK/NACK resource, for carrying ACK/NACK corresponding to downlink data, in a sub-frame n according to a set of sub-frames including a sub-frame in which the downlink data is transmitted comprises:

if the sub-frame in which the downlink data is transmitted belongs to the first set of sub-frames, then determining the ACK/NACK resource, for carrying the ACK/NACK corresponding to the downlink data, in the sub-frame n according to a scheme and parameters corresponding to the first set of sub-frames; and if the sub-frame in which the downlink data is transmitted belongs to the second set of sub-frames, then determining the ACK/NACK resource, for carrying the ACK/NACK corresponding to the downlink data, in the sub-frame n according to a scheme and parameters corresponding to the second set of sub frames.

13. The method according to claim 12, wherein if the sub-frame in which the downlink data is transmitted belongs to the first set of sub-frames, then information about the ACK/NACK resource, for carrying the ACK/NACK corresponding to the downlink data, in the sub-frame n for the first set of sub-frames is obtained using a PUCCH resource obtaining scheme and relevant parameters predefined for a non-dynamic system.

14. The method according to claim 12, wherein if the sub-frame in which the downlink data is transmitted belongs to the second set of sub-frames, then the method further comprises:

transmitting higher layer signaling to the user equipment to indicate information about the ACK/NACK resource, for carrying the ACK/NACK corresponding to the downlink data, in the sub-frame n for the second set of sub-frames.

15. The method according to claim 14, wherein the higher layer signaling includes information about ACK/NACK resource, for carrying ACK/NACK in the corresponding sub-frame n, configured by a base station for a first sub-frame in the second set of sub-frames;

or the higher signaling includes information about ACK/NACK resource, for carrying ACK/NACK in the corresponding sub-frame n, configured by the base station for a part or all of the sub-frames in the second set of sub-frames.

16. The method according to claim 12, wherein information about ACK/NACK resource, in the sub-frame n, for carrying ACK/NACK corresponding to each sub-frame in the second set of sub-frames is obtained in a predefined configuration scheme; and the predefined configuration scheme includes:

$$n_{PUCCH,i}^{(1)} = F + (M_{dyn} - i - 1)N_p + iN_{p+1} + n_{CCE};$$

wherein F is a predefined resource starting point of ACK/NACK corresponding to the second set of sub-frames, $M_{dyn}$ is the number of sub-frames in the second set of sub-frame, $n_{CCE}$ is the index of a first CCE, in a sub-frame $n-k_m$, used for a PDCCH, $N_p = \max\{0, \lfloor [N_{RB}^{DL} \times (N_{sc}^{RB} \times p - 4)]/36 \rfloor\}$ with $N_{RB}^{DL}$ being the number of downlink PRBs $N_{sc}^{RB}$ being the number of sub-carriers in a PRB, that is, 12, and p being a value in $\{0,1,2,3\}$, and $n_{PUCCH,i}^{(1)}$ is an ACK/NACK/SR, resource index corresponding to the i-th sub-frame in the second set of sub-frames; and when the index of a CCE corresponds to multiple ACK/NACK resources, after obtaining an ACK/NACK resource in the formula of $n_{PUCCH,i}^{(1)} = F + (M_{dyn} - i - 1)N_p + iN_{p+1} + n_{CCE}$, another ACK/NACK resource is further obtained by adding a preset offset to the ACK/NACK resource.

17. The method according to claim 16, wherein information about the predefined resource starting point of ACK/NACK corresponding to the second set of sub-frames is transmitted to the user equipment side, and the information about the predefined resource starting point is calculated in the formula of:

$$F = N_{PUCCH,dynamic}^{(1)};$$

or $$F = N_{PUCCH}^{(1)} + \Delta_{R8};$$

or $$F = \begin{cases} M_{R8}N_n - (M_{R8} - k_{R8})(N_n - N_{n-1}) & n = 3 \\ M_{R8}N_n & n = 0, 1, 2; \end{cases}$$

wherein F is the predefined resource starting point of ACK/NACK corresponding to the second set of sub-frames, $N_{PUCCH,dynamic}^{(1)}$ is the predefined resource starting point of ACK/NACK corresponding to the second set of sub-frames, $N_{PUCCH}^{(1)}$ is a predefined resource starting point of ACK/NACK for a non-dynamic system user, $\Delta_{R8}$ is ACK/NACK resource reserved for the non-dynamic system user, $M_{dyn}$ is the number of sub-frames in the P set of sub-frames, $M_{R8}$ is the number of sub-frames in the P set of sub-frames, $k_{R8}$ is the number of special timeslots in the P set of sub-frames, $N_n$ is the number of CCEs carried in n PDCCH symbols, and n is the highest number of PDCCH occupied symbols in the P set of sub-frames.

18. The method according to claim 17, further comprising: transmitting the highest number of PDCCH occupied symbols in the P set of sub-frames to the user equipment in higher layer signaling or configuring it by default.

19. An uplink feedback apparatus, applicable to a dynamic sub-frame system, the apparatus comprising:
an obtaining unit configured to determine ACK/NACK resource, for carrying ACK/NAC corresponding to downlink data, in a sub-frame n according to a set of sub-frames including a sub-frame in which the downlink data is received; and
a transmitting unit configured to transmit ACK/NACK information corresponding to the downlink data over the ACK/NACK resource in the sub-frame n,
wherein the set of sub-frames includes a first set of sub-frames and/or a second set of sub-frames; the first set of sub-frames and/or the second set of sub-frames are/is determined by obtained uplink/downlink sub-frame configuration information and flexible sub-frame information; the uplink/downlink subframe configuration information indicates the type of each sub-frame in a radio frame, and corresponding types of sub-frames include uplink sub-frames, downlink sub-frames and special sub-frames; and the flexible sub-frame information indicates the type of each sub-frame in a radio frame, and corresponding types of sub-frames, include uplink sub-frames, downlink sub-frames, special sub-frames and flexible sub-frames, wherein the flexible sub-frame can be used for transmission of uplink or downlink data, and n is a sub-frame number,
wherein the first set of sub-frames includes at least all the sub-frames belonging to both a set P and a set Q; and the second set of sub-frames includes all the sub-frames belonging to the set Q but not the set P, wherein:
the obtaining unit determines the set P according to the uplink/downlink sub-frame configuration information, and the set P includes the downlink sub-frames and/or the special sub-frames indicated by the uplink/downlink sub-frame configuration information; and
the obtaining unit determines the set Q according to the flexible sub-frame information, and the set Q includes any one or more of the downlink sub-frames, the special sub-frames and the flexible sub-frames indicated by the flexible sub-frame information.

20. The apparatus according to claim 19, wherein the obtaining unit is configured to determine the ACK/NACK resource, for carrying the ACK/NACK corresponding to the downlink data, in the sub-frame n according to a scheme and parameters corresponding to the first set of sub-frames in the case that the sub-frame in which the downlink data is received belongs to the first set of sub-frames; and
to determine the ACK/NACK resource, for carrying the ACK/NACK corresponding to the downlink data, in the sub-frame n according to a scheme and parameters corresponding to the second set of sub-frames in the case that the sub-frame in which the downlink data is received belongs to the second set of sub-frames.

* * * * *